United States Patent
Darcy et al.

(10) Patent No.: US 11,640,284 B2
(45) Date of Patent: May 2, 2023

(54) MULTI-PLATFORM COMPILING

(71) Applicant: Oracle International Corporation, Redwood City, CA (US)

(72) Inventors: Joseph D. Darcy, Redwood City, CA (US); Jonathan J. Gibbons, Mountain View, CA (US); Jan Lahoda, Polna (CZ); Magnus Ihse Bursie, Stockholm (SE)

(73) Assignee: Oracle International Corporation, Redwood City, CA (US)

( * ) Notice: Subject to any disclaimer, the term of this patent is extended or adjusted under 35 U.S.C. 154(b) by 6 days.

(21) Appl. No.: 14/957,530

(22) Filed: Dec. 2, 2015

(65) Prior Publication Data

US 2017/0161033 A1 Jun. 8, 2017

Related U.S. Application Data

(60) Provisional application No. 62/261,257, filed on Nov. 30, 2015.

(51) Int. Cl.
*G06F 8/41* (2018.01)
(52) U.S. Cl.
CPC ...................................... *G06F 8/41* (2013.01)
(58) Field of Classification Search
CPC ........................................................ G06F 8/41
USPC ........................................................ 717/140
See application file for complete search history.

(56) References Cited

U.S. PATENT DOCUMENTS

| | | | |
|---|---|---|---|
| 6,286,134 B1 | 9/2001 | Click, Jr. et al. | |
| 6,389,460 B1 * | 5/2002 | Stewart | G06F 17/30899 |
| | | | 707/999.104 |
| 6,466,999 B1 * | 10/2002 | Sliger | H03M 7/30 |
| | | | 710/68 |

(Continued)

OTHER PUBLICATIONS

Joseph D. Darcy's Web Blog, "New javac warning for setting an older source without bootclasspath," Oracle, Dec. 21, 2010, downloaded from https://blogs.oracle.com/darcy/entry/bootclasspath_older_source on Jun. 4, 2015, pp. 1-5.

(Continued)

*Primary Examiner* — Chat C Do
*Assistant Examiner* — Bradford F Wheaton
(74) *Attorney, Agent, or Firm* — Robert C. Kowert; Kowert, Hood, Munyon, Rankin & Goetzel, P.C.

(57) ABSTRACT

Cross-compiling, by a multi-version compiler, may produce complied code targeted to a specified release version of a programming platform supported by the compiler. The specified version may be different from a default version of the programming platform targeted by the compiler. Thus, the multi-version compiler may cross-compile source code to generate compiled code for different versions of the programming platform. A developer may specify the target version using a single compiler option and the compiler may, in response, cross-compile for the target version without requiring any additional options to be configured by the user. The multi-version compiler may include library data regarding multiple versions of the programming platform, preventing a developer from having to locate and provide the necessary library data for each targeted version.

17 Claims, 9 Drawing Sheets

(56) References Cited

U.S. PATENT DOCUMENTS

| | | | | |
|---|---|---|---|---|
| 6,532,588 | B1* | 3/2003 | Porter | G06F 8/61 |
| | | | | 707/999.202 |
| 7,922,078 | B1* | 4/2011 | Putman | G07F 19/20 |
| | | | | 235/379 |
| 8,612,947 | B2 | 12/2013 | LeRoux et al. | |
| 2005/0015236 | A1 | 1/2005 | Wain et al. | |
| 2008/0091724 | A1* | 4/2008 | Qiu | G01B 11/24 |
| 2009/0282391 | A1* | 11/2009 | Gutierrez | G06F 8/10 |
| | | | | 717/128 |
| 2010/0235823 | A1* | 9/2010 | Garbers | G06F 8/71 |
| | | | | 717/170 |
| 2013/0144589 | A1* | 6/2013 | Levi | G06F 30/327 |
| | | | | 703/14 |
| 2013/0152058 | A1* | 6/2013 | Schmuck | G06F 8/40 |
| | | | | 717/137 |
| 2013/0167112 | A1* | 6/2013 | Bostian | G06F 8/47 |
| | | | | 717/106 |
| 2013/0339928 | A1* | 12/2013 | Trofin | G06F 9/44521 |
| | | | | 717/122 |
| 2016/0085545 | A1* | 3/2016 | Togan | G06F 9/4486 |
| | | | | 717/121 |

OTHER PUBLICATIONS

Joseph D. Darcy's Web Blog, "How to cross-compile for older platform versions," Oracle, Feb. 25, 2008, downloaded from https://blogs.oracle.com/darcy/entry/how_to_cross_compile_for on Jun. 4, 2015, pp. 1-5.

* cited by examiner

MULTI-PLATFORM COMPILING

This application claims priority to U.S. Provisional Patent Application Ser. No. 62/261,257, filed Nov. 30, 2015, entitled "Multi-Platform Compiling", which is hereby incorporated by reference herein in its entirety.

BACKGROUND

Traditionally, cross-compiling, that is compiling a software module using one version of a programming platform for execution according to a different version of the programming platform, requires the developer to correctly set multiple compiler and/or linker options. By default, however, many compilers compile against the most-recent version of the programming platform, such as by using the application programming interfaces (APIs) targeting the current version of the programming platform. Thus, a compiled program may accidentally use APIs only available in the current version of the programming platform. Such programs may or may not run correctly (or cannot execute at all) on older (or, in general, different) versions of the programming platform, regardless of the particular values used when configuring the compiler.

Using a Java-based example, the javac compiler can be used to cross-compile libraries (or other software modules) for older versions of the Java Runtime Environment (JRE), Java Development Kit (JDK) or a similar bundling of the Java platform. For instance, the javac compiler provides two command line options (i.e., —source and —target) which can be used to select the version of the Java Programming Language used by the compiler during compilation as well as the target version of the executable output format (e.g., as realized by class files) used for the class files produced.

Properly cross-compiling traditionally frequently requires correctly setting multiple compiler and/or linker options. For instance, cross-compilation of libraries for older versions of a JRE and/or JDK traditionally requires the developer to configure up to three options (e.g., —source, —target, and —bootclasspath). However, configuring these options is generally error prone since developers frequently fail to set (or set incorrectly) one or more of the options. The developer may also have to locate and/or provide the compiler with appropriate library data (e.g., rt.jar) for the target version of the programming platform.

Requiring multiple options to be correctly set often results in spurious error/bug reports that may actually result from incorrect options being used or from a failure to set a particular option. While some compilers may issue warnings related to incorrectly set options (or for options that were not set), setting multiple compiler/linker options for cross-compiling (e.g., for different versions) may be inconvenient and error-prone.

SUMMARY

Described herein, according to various embodiments, are techniques for performing cross-compiling by a multi-version compiler. For example, a multi-version compiler may cross-compile source code to generate compiled code (e.g., software modules, class files, libraries, etc.) for different versions (e.g., families, editions, releases, updates, etc.) of a programming platform. For instance, in one embodiment, a user (e.g., a programmer or developer) may specify the target release version of the programming platform using a version option within a compile command. In response, the multi-version compiler may cross-compile the source code (e.g., using the appropriate programming language version, executable output format and base library according to the specified release version) without requiring any additional options specified by the user.

A multi-version compiler may receive a compile command that includes a version option specifying a particular release version of a plurality of programming platform versions supported by the compiler. The target release version of the programming platform may in some embodiments represent a combination of a source language version, a target class file version (e.g., executable output version) and core library version. In response to the compile command, the compiler may access library data for a specified version of the programming platform from a library data repository of the compiler. The library data may include, but may not be limited to, information regarding the types, APIs, interfaces, etc., used when compiling source code according to the specified release version. The library data repository may include library data for various versions (e.g., families, editions, releases, updates, etc.) of a programming platform supported by the compiler.

The compiler may then compile the source to generate compiled code targeted to a specified version of the programming platform according to a particular version of the programming language used to write the source code (which may be different that the default or current version of the programming language used by the compiler) and using the library data against which the source files are to be compiled.

In some embodiments, a single compiler option may be used to specify the release version. For example, in one Java-based embodiment, a single option, such as "—platform" or "—release", may be used to specify the release version for the compiler to use when compiling source code.

Additionally, the multi-version compiler (or a development system including the multi-version compiler) may include (or provide) the library data, rather than requiring the user (e.g., programmer or developer) to obtain, install and specify the location of, library data for the targeted version of a programming platform when cross-compiling. Library data may include information regarding different versions of a programming platform for use by a compiler in order to produce cross-compiled code targeting those different versions. For example, according to one Java-based embodiment, a current version of the Java Runtime Environment (JRE), Java Development Kit (JDK) or a similar bundling of the Java platform, may be configured to include and/or provide library data (e.g., type, API and/or interface information, such as in an rt.jar or ct.sym file) for various other versions of the JRE for use by the javac compiler when cross-compiling as described herein. Thus, a developer may not have to locate and provide the necessary library data for each targeted version.

DETAILED DESCRIPTION OF EMBODIMENTS

Figure 1:
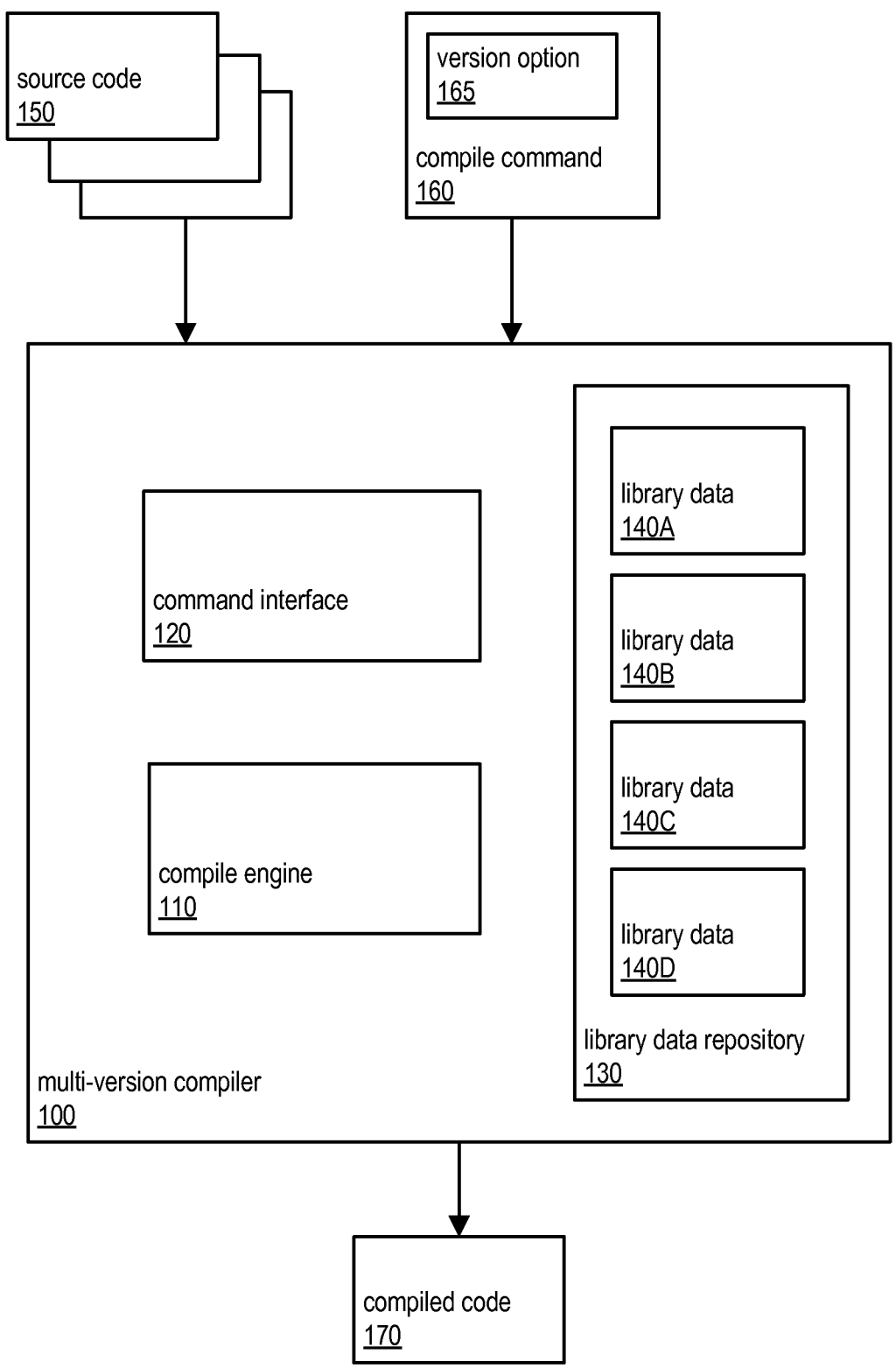
FIG. 1 is a logical block diagram illustrating a multi-version compiler, as described herein according to one embodiment.

Described herein are a system and methods for cross-compiling for different versions of a programming platform, according to various embodiments. When cross-compiling, such as when a multi-version compiler produces compiled code targeted to a different version (e.g., family, edition, release, update, etc.) of a programming platform that the compiler targets by default, the developer may specify the target release version using a single compiler option, according to some embodiments. As noted above, the target release version of the programming platform may in some embodiments represent a combination of a source language version, a target class file version (e.g., executable output version) and core library version. Thus, a programming platform, as described herein, may in some embodiments be considered a tuple of configuration information used by a compiler during compilation. The configuration information stored in such a tuple may include (or specify) a triple of source version (e.g., of the programming language), executable output format, and a set of default libraries, according to one embodiment.

A multi-version compiler may be able to compile source code using various versions of the source programming language (e.g., as described by the programming language specification). A multi-version compiler may also be able to generate compiled code according to various executable output formats and may be able to utilize different base platform libraries against which the source files are compiled. For instance, in one Java-based example, the javac compiler may be able to compile source code using various versions of the Java Programming Language (e.g., as described by the Java Language Specification), while supporting various executable output formats (e.g., class file formats described by the Java Virtual Machine Specification) using various platform libraries. Thus, the format and semantics of the executable output may be versioned similarly to the format and semantics of the source programming language. Traditionally, the javac compiler utilized different compile options (e.g., —source, —target and —bootclasspath) to specify the particular versions used during compilation. However, a multi-version compiler, as described herein, may utilize a single compile option (e.g., "—platform" or "—release") to specify a target release that indicates or identifies a particular version of the programming language, a particular executable output format, and a particular version of the base platform libraries to be used by the multi-version compiler.

In some embodiments, one or more constraints may be placed on the versions specified by target programming platform. For example, the version of the executable output format specified by a particular target programming platform may be required to be higher (e.g., chronologically later) than the version of the source programming language also specified by that same target programming platform. Similarly, in some embodiments, particular versions of the base platform libraries may not be appropriate for use with certain versions of source programming language (e.g., certain types within the libraries may have to be available to support certain source constructs). Thus, in some embodiments target programming platforms may be constrained to certain pairs of source programming language versions and base platform library versions. However, in other embodiments, no constraints may be placed on the particular versions (e.g., of source programming language, executable output format, and base platform libraries) specified by a particular target programming platform.

Thus, cross-compiling may involve a multi-version compiler producing code for a version of a programming platform that is different than a default version that the compiler targets normally. A multi-version (or cross-platform) compiler may detect the fact that a user (e.g., programmer or developer) desires to compile source code targeted to a particular release version out of multiple release versions of a programming platform supported by the compiler. For example, the compiler may receive a compile command that includes a version option specifying the target release version of the programming platform and, in response, may compile the source code according to a particular version of the programming language, generating compiled code according to a particular executable output format (e.g., a particular class file format) and using library data for a target version to produce compiled code (e.g., a software module, application, class file, object code, library, etc.) targeted to the specified release version of the programming platform.

While, for purposes of illustration, the following description uses the Java™ programming language (or a language closely related to Java™), the techniques described may be used with any compiler that supports cross-compiling for different versions of a programming platform. The techniques may also be used for object-oriented languages or for non-object-oriented languages (such as various procedural languages), according to various embodiments. Thus, while the techniques described herein are described mainly in terms of Java-based systems, the same methods, techniques and mechanisms may also apply to (and may be used with any of various systems and/or languages. For instance, the methods, techniques and/or mechanisms described herein may be used with Java Development Kits (JDKs), Java Runtime Environments (JREs), Java Standard Edition (SE), Java Micro Edition (ME), as well as with virtually any language/system that allows compiling/linking for various versions of a programming platform. Furthermore, a version of a programming platform, as described herein may also represent any of various versions, families, releases, editions, updates, etc., of a programming platform, according to various embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. Additionally, when used in the claims, the term "or" is used as an inclusive or and not as an exclusive or. For example, the phrase "at least one of x, y, or z" means any one of x, y, and z, as well as any combination thereof.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates a workflow for cross-compiling source code using a multi-version, or cross-platform, compiler, according to one embodiment. According to the illustrated embodiment, the workflow begins when a multi-version compiler, such as multi-version compiler 100, receives source code 150. In various embodiments, source code 150 may be specified in any of various high-level and/or object-oriented programming languages, such as Java™, C#, and/or other languages. For instance, in one embodiment, source code 150 may be a set of .java files.

The multi-version compiler 100 may compile the source code 150 to generate compiled code 170, such as to produce an executable version of the source code, targeted to a particular release version of a programming platform supported by the compiler. As noted above, a particular release version may indicate a particular version of the programming language, a particular executable output format (e.g., class files according to a Java-based example) and a particular version of library data (e.g., base platform libraries) to be used during compilation, according to some embodiments. For example, multi-version compiler 100 may by default compile source code for one release version of the programming platform (e.g., using a default version of the programming language, a default executable output format, and using a default version of the library data). However, multi-version compiler 100 may be configured to cross-compile source code 150 to produce compiled code 170 targeting a different release version of the programming platform (e.g., using a different version of the programming language, a different executable output format, and/or using a different version of the library data). For example, in one embodiment multi-version compiler 100 may represent a Java-based compiler that, by default, compiles software modules for a current version (e.g., family, edition, release, update, etc.) of the JRE and/or JDK, but which may also be configured to cross-compile to produce compiled code for other versions (e.g., other families, editions, releases, updates, etc.) of the JRE and/or JDK. For instance, a Java compiler (e.g., the javac compiler) from a current version of the JRE and/or JDK may be used to cross-compiler for older versions (e.g., older families, editions, releases, updates, etc.) of the JRE, as one example embodiment. Additionally, the techniques described herein with reference to the JRE apply equally to the JDK or a similar bundling of the Java platform. Similarly, the techniques described herein with reference to the JDK apply equally to the JRE or a similar bundling of the Java platform.

In some embodiments, two different target release versions of a programming platform may indicate the same version of the programming language but different executable output formats and/or different library data versions. Alternatively, different target release versions of a programming platform may indicate different versions of the programming language while indicating the same executable output format and/or library data versions. Thus, according to various embodiments, a release version may indicate a particular version of the programming language, a particular executable output format and a particular version of library data to be used during compilation, and different release versions may vary by indicating different versions of one or more of the options.

Multi-version compiler 100 may receive compile command 160 that includes version option 165. Compile command 160 may represent any of various mechanisms for initiating a compile. For example, in one embodiment, compile command 160 may represent a command issued via a command line interface and thus may be part of executing the compiler. A command line interface may be used to execute the compiler and may also specify the source code, such as source code 150, and version option 165, according to one embodiment. In other embodiments, compile command 160 may represent a command issued via a programmatic interface, such as via a make utility, an integrated development environment (IDE), a runtime (e.g., just-in-time) compile utility, or virtually other development tool, whether command line based, graphical user interface (GUI) based, or without any user interface. For instance, in one Java based embodiment, the javac compiler may be invoked via a command line interface or via a programmatic interface, either directly by a developer or by any of various development tools.

In some embodiments, multi-version compiler 100 may include one or more sub-modules, such as command interface 120, configured to receive compile commands (such as compile command 160), identify the options included with the compile command, such as version option 165 within compile command 160, and pass information to other parts of multi-version compiler, such as to compile engine 110. Compile engine 110 may be configured to perform the actual compiling of source code, according to some embodiments. While illustrated as separate entities within multi-version compiler 100, in some embodiments, command interface 120 and/or compile engine 110 may not be separate modules or entities, but instead may represent various functions or features performed by multi-version compiler 100.

As part of cross-compiling for different versions of a programming platform, multi-version compiler 100 may be configured to locate, access and utilize information regarding the various versions, such as by locating, accessing and utilizing library data 140A, 140B, 140C, and/or 140D in library data repository 130. For instance, command interface 120, compile engine 110 and/or some other part of multi-version compiler 100 may be configured to access library data from library data repository 130. Multi-version compiler 100 may be configured to access library data repository 130 in response to compile command 160. Multi-version compiler 100 may determine which specific library data to access based on version option 165, which may specify a particular release version of the programming platform which may indicate a particular set of library data.

The library data repository may include library data for various versions (e.g., families, editions, releases, updates, etc.) of a programming platform libraries supported by the multi-version compiler. Additionally, in some embodiments, the library data for the various versions of the programming platform may represent various versions of base platform libraries corresponding to various programming platforms.

In some embodiments, library data 140A-D may represent any of various types of information required by multi-version compiler 100 in order to properly generate compiled code targeted to a particular version of a programming platform. For instance, in one Java-based embodiment, library data 140 may represent various type and/or interface information (e.g., such as may be found in an rt.jar or ct.sym file) regarding the target version of the programming platform.

While traditionally a developer may be required provide library data (e.g., rt.jar file) required for cross-compiling, in some embodiments, library data for the various versions supported by multi-version compiler 100 may be provided as part of multi-version compiler 100. For instance, both multi-version compiler 100 and library data repository 130 (including library data 140A-D) may be installed at the same time, by the same installation procedure, or as part of a single installation, according to various embodiments.

While library data repository 130 is illustrated as include four sets of library data, a library data repository may include virtually any number of set of library data in various embodiments. Additionally, multi-version compiler 100 may support multiple programming platforms and therefore may be configured to generate compiled code targeted to various versions of different platforms. For instance, in one example embodiment, multi-version compiler 100 may be configured to compile Java source code into compiled code (e.g., class files) targeted to Java Standard Edition (Java SE), Java Enterprise Edition (Java EE), Java Micro Edition (Java ME), and/or other Java-based platforms, such as JavaFX. Additionally, multi-version compiler 100 may be configured to generate compiled code targeted to individual sub-versions (e.g., releases, updates, etc.) within versions of a targeted platform. Additionally in some embodiments, a base library used during compilation may include two fundamental parts and each part may be updated individually between library releases.

For instance, in one Java-based example, a base library may include the Java SE libraries (e.g., standardized under the Java Community Process, typically in the java.* and javax.* packages) and the Java Development Kit (JDK) specific APIs (e.g., typically in the jdk.* or com.sun.* packages). Within a given update release family (e.g., JDK 8 and its updates) the base library may change from release to release. For example, the JDK-specific API portion may be updated, such as support a new feature. Additionally, however, the Java SE portion of the library data may also be updated. In some embodiments, one part of a base library (e.g., the Java SE portion of the API) may only be updated for platform releases, such as updating from JDK 7 to JDK 8 and updating from implementing the Java SE 7 specification to the Java SE 8 specification, according to one Java-based example. Thus, a multi-version compiler may be able to target (and use) any particular version, sub-version, or update of library data when compiling and the targeted release version of the programming platform may, in general, indicate any particular version, sub-version, or update of library data, according to various embodiments.

While FIG. 1 illustrates library data repository 130 included with, or as part of, multi-version compiler 100, in some embodiment, library data repository 130, and the library data 140A-D within, may be stored separately from, but accessible by, multi-version compiler 100, while still being considered part of multi-version compiler 100. For example, in one embodiment, library data repository 130 may be stored remotely on a storage device accessible by multi-version compiler 100 (e.g., such as via a network, intranet, internet, etc.). In another embodiment, library data repository 130 may reside (e.g., may be stored) on the same system (whether or not on the same storage device) as multi-version compiler 100 without actually being included within multi-version compiler 100. Furthermore, in some embodiments, library data repository 130 may be distributed among various locations, such that some library data is local to multi-version compiler 100 while other library data is remote from multi-version compiler 100. When stored remotely from multi-version compiler 100, library data repository 130 and the library data 140 within, may still be considered part of multi-version compiler 100.

While described herein mainly in terms of the Java Programming Language and Java-based platforms (e.g., Java, Java ME, Java SE, JDKs, JREs etc.), the techniques, methods and/or mechanisms described herein regarding cross-compiling for multiple platform versions may be also apply (and may be used for) other programming languages and/or platforms. For example, the techniques, methods and/or mechanisms described herein may be used with any of various programming language(s) and/or platform(s), such as Java, C, C++, with other platforms, or virtually any multi-version or multi-version compiler regardless of the particular programming language(s) and/or platform(s) it is used with. For instance, a multi-version C# compiler may also be configured to utilize the techniques described herein to implement compiling for previous versions (or different versions) of a platform, according to one example embodiment.

Figure 2:
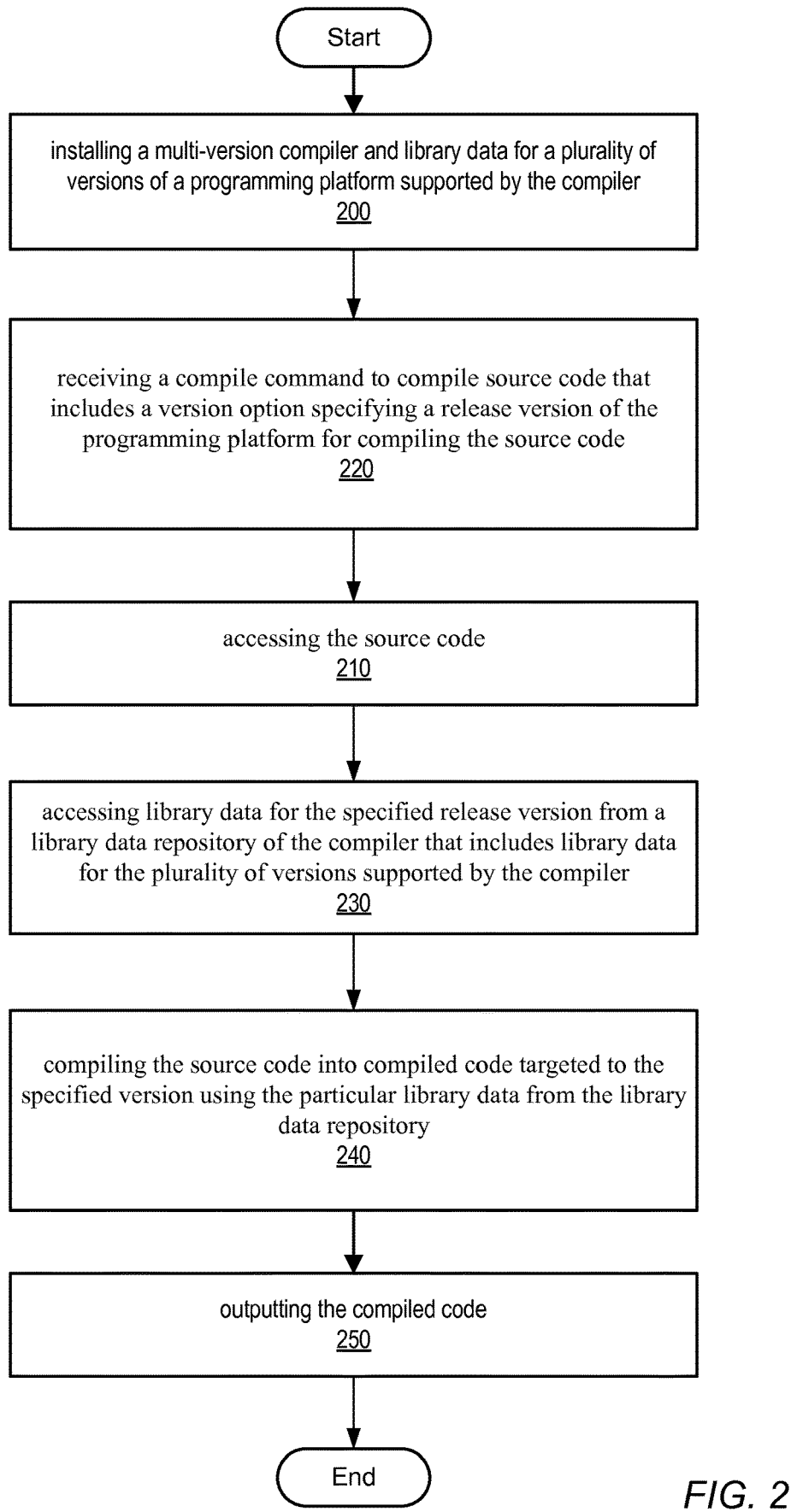
FIG. 2 is a flowchart illustrating one embodiment of a method for cross-compiling by a multi-version compiler, as described herein.

FIG. 2 is a flowchart illustrating one embodiment of a method for cross-compiling for different versions, as described herein. As illustrated by block 200, a multi-version compiler (e.g., multi-version compiler 100) as well as library data for a plurality of versions of a programming platform supported by the compiler (e.g., library data 140A-D), may be installed. For example, a development system may include a multi-version compiler and library data regarding multiple versions (e.g., different versions, families, editions, releases, updates, etc. of one or more platforms of a programming platform) supported by the compiler. Rather than requiring a developer to separately obtain or provide library data for each version of a programming platform supported by the compiler the library data may be provided with, or as part of, the multi-version compiler.

In some embodiments, the compiler and the library data may be installed as part of a single installation. Additionally, library data for one or more versions of a programming platform may be installed when the compiler is installed, but additional library data (e.g., for different versions) may also be installed at a later time, but may still be considered part of the compiler. In some embodiments, the compiler and library data may be installed together locally, such as to the same machine, system or storage device, but in other embodiments, the compiler and library data may be installed remotely from each other, but may still be considered part of the same development system.

In one embodiment, library data repository 130 may include library data that may represent various different versions (or families, editions, releases, updates, etc.) of a programming platform or may represent different versions of a programming platform. For instance, a Java-based multi-version compiler configured to use the current version of the JRE (e.g., by default) may also include library data (e.g., information regarding the types, interfaces, classes, methods, APIs, etc.) for one or more other versions of the JRE, according to one embodiment. The multi-version compiler may also support versions that represent both earlier and later versions (e.g., families, editions, releases, updates, etc.) of the programming platform. For example, a Java-based multi-version compiler may support version 8 of the JRE by default, but may also support earlier versions (e.g., versions 6 and 7) and later versions (e.g., version 9) of the JRE.

Additionally, a multi-version compiler may be configured to support different versions of different programming platforms, according to some embodiments. For example, a Java-based multi-version compiler may, by default, support a particular version or profile of the JRE, but may also be configured to generate compiled code targeting various versions of Java ME and/or various versions of Java SE.

As illustrated in block 210, the compiler may receive and/or access source code to be compiled. For instance, multi-version compiler 100 may receive or access source code 150 to be compiled. Source code 150 may represent one or more files including program instructions to be compiled by multi-version compiler 100 into compiled code 170. The source code may be written in any of various languages and may also be written according to a previous (e.g., earlier) programming language specification that may correspond to the particular target version. For instance, in one example, a Java-based compiler that, by default, uses the version 8 Java language specification may receive source code written according to the version 6 or version 7 of the Java programming language.

By default, a multi-version compiler, such as multi-version compiler 100, may be configured to compile (e.g., by default) against the most-recent version of programming platform APIs (or those that were most recent when the compiler was released). Therefore, by default compiled code may be configured to only use APIs that are available in that particular version of the programming platform. Thus, a developer may specify a version option to the compiler specifying that the compiler should compile source code into compiled code targeted to a particular target version that may be different than the default version targeted by the compiler. For example, the compiler may also receive a compile command to compile the source code that includes a version option specifying a particular version, of multiple versions of a programming platform supported by the compiler, to be targeted by the compiler when compiling the source code, as in block 220.

In one embodiment, multi-version compiler 100 may receive compile command 160 that includes version option 165. Version option 165 may specify a particular version as a target for compiling source code 150. For example, in one embodiment, version option 165 may represent a command line option, such as a "—platform" or "—release" option specifying a particular release version of a programming platform which multi-version compiler 100 should target when compiling source code 150. Thus, in this example, compiled code 170 may be compiled according to a particular language version, execute according to (and use) the types, interfaces, APIs, etc. of, a particular platform version (i.e., rather than according to a default version that the compiler may be configured to use normally) indicated by the specified release version.

For example, the multi-version compiler may accept various user configurable options, such as via a command line, build utility, and/or graphical user interface, one of which may be used to indicate a particular version of a programming platform to be used as a target for cross-compiling by the multi-version compiler. For instance, in one example embodiment, a javac compiler that by default targets a current version of the JRE may be configured to cross-compile source code targeting a previous version of the JRE. Thus, the compiled code may be configured to execute according to the previous version of the JRE. For instance, the compiled code may utilize the types, classes, methods, APIs, etc. as defined in the previous version of the JRE rather than as they may be defined in the current version of the JRE.

The particular version (or the particular version of a particular platform) may be identified (e.g., specified) via a single compiler option in any of various manners, according to various embodiments. For example, in one embodiment, the target version may be identified by name, while in another embodiment the target version may be identified by a unique ID, such as a version or release number. In general, versions of a programming platform may be identified (or specified) using any suitable method or technique.

Thus, version option 165 may include a value specifying or identifying the particular version to be targeted. For instance, a version option, such as "—platform N" or "—release N" may include a single value corresponding to a particular version (e.g., N may represent a version number or name, such as "6" or "Java6").

In one Java-based embodiment, the javac compiler may accept "—platform" as an option (e.g., via a command line or programmatic interface option) indicating a particular version of the JRE to target when cross-compiling source code. The "—platform" option (whether set via a command line, build utility or graphical user interface) may be received by the compiler and indicate that the compiler should produce compiled code according to a particular executable output format (e.g., class files when using a Java-based example) targeted to the specified target version (e.g., the particular version, family, release, update, etc. of a JRE).

In some embodiments, multi-version compiler 100 may include command interface 120 that may be configured to receive compile command 160, identify version option 165 and determine the specified version. Additionally, command interface 120 may be configured to locate the library data and pass information to compile engine 110 specifying the particular target version and the location of the library data that should be used to compile source code 150. In other embodiments, however command interface 120 may be configured to simply analyze compile command 160, identify version option 165 and provide version option 165 (and/or any value of version option 165) to compile engine 110, which may then access and use the appropriate library data.

While described herein as being separate, in some embodiments, command interface 120 and compile engine 110 may only represent a logical separation to describe different aspects of multi-version compiler 100, and thus multi-version compiler 100 may not include a separate command interface or a separate compile engine.

In response to compile command 160 with the included version option 165, the compiler may be configured to access library data for the specified version from a library data repository that includes library data for the versions supported by the compiler, as illustrated in block 230. In some embodiments, the library data repository may be part of the compiler, as described above regarding block 200 of FIG. 2. The library data in the library data repository may be stored in any of various formats, according to different embodiments, as will be discussed in more detail regarding subsequent figures. As noted above, the library data for the target version may include various types of information, such as information regarding the types, interfaces and API's for the specified version.

The compiler may compile the source code into compiled code targeted to the specified version using the appropriate library data from the library data repository, as in block 240 and output the compiled code, as in block 250. For example, multi-version compiler may compile source code 150 into compiled code 170 using library data 140A and targeting the version of the programming platform.

Additionally, the version option 165 may also indicate a particular set of library data, such as library data 140A-D, to be used when cross-compiling source code 150. For example, version option 165 may indicate (e.g., indirectly), a particular location within library data repository 130 from which to load library data for use when cross-compiling. Rather than requiring the developer to provide, and specify the location of, the library data, the library data for the versions supported by the compiler may by supplied with the compiler. In some embodiments, multi-version compiler 100 may include compile engine 110 that may be configured to perform the actual compiling of the source code and may receive information from command interface 120 that specifies the particular target version, and/or the location of the library data to use when compiling source code 150, as described above.

A developer may specify a target version of a programming platform to target using the single version option without separately specifying a source version, a target version, or the location of the appropriate library data, according to some embodiments.

Thus, in some embodiments, the compile command 160 may not specify the location of the library data to be used when compiling the source code. In other words, the developer may specify the target release version using a single version option (e.g., such as via a "—platform" or "—release" option) and from that single option, the compiler may compile the source code into compiled code targeted to the specified version using the library data indicated by the specified release version.

In some embodiments, one or more parts (e.g., modules, sections, functions, methods, etc.) of multi-version compiler 100 may not be configured to recognize the value of the version option 165. Thus, in response to the single compiler option (e.g., compile command 160 with version option 165) being used to specify a target release version, command interface 120 may interpret compile command 160 and version option 165 to provide the specified information to other portions of the compiler, such as to compile engine 110, in a different manner or format.

For instance, according to one Java-based embodiment, one or more portions of the javac compiler may recognize a —source, a —target and/or a —bootclasspath option, but may not recognize a "—platform" option. Therefore, one portion of the compiler, such as command interface 120 may use the value of the "—platform" option to provide the specified information to other portions of the compiler, such as to compile engine 110, using a —source, a —target and/or a —bootclasspath option, according to one example embodiment.

In one embodiment, command interface 120 may macro-expand the single compiler option into the other format for use by compile engine 110. For instance, using a Java-based example, a multi-version compiler may be configured to macro-expand:

—platform N
into:
—source N —target N —bootclasspath ct-N.sym
where ct-N.sym identifies a ct.sym file representing the library data from the JRE version N. Thus, in some embodiments, an option such as "-platform N" or "-release N" may be considered the equivalent of "-source N —target N —bootclasspath ct-N.sym."

In some embodiments, command interface 120 may represent a make or build utility that may configure the additional compiler options based on the single compiler option before executing the multi-version compiler (e.g., macro expanding the "—platform" (or "—release") option into separate "—source", "—target' and "—bootclasspath" options).

Additionally, cross-compiling may involve accessing library data for the target release version of the programming platform. As noted above, library data regarding various versions of a programming platform, regarding various versions of various platforms of a programming platform, or a combination of the two, may be stored within a library data repository that is part of, or is accessible by, the multi-version compiler. For instance, in one embodiment, one or more files installed as part of multi-version compiler 100 may include library data for a plurality of versions supported by the compiler and multi-version compiler 100 may be configured to access library data from those files. Alternatively, in another embodiment, the multi-version compiler 100 may include a programmatic interface allowing the compiler to access remotely stored library data regarding a particular version (e.g., over a local network, over the Internet, via a web-based service interface, etc.).

As noted above, library data may include, but may not be limited to, information regarding the types, classes, methods, APIs, interfaces, etc., of the target release version. The particular manner in which the library data is accessed and the exact data format of the library data may vary from embodiment to embodiment, as will be discussed in more detail subsequently.

Figure 3:
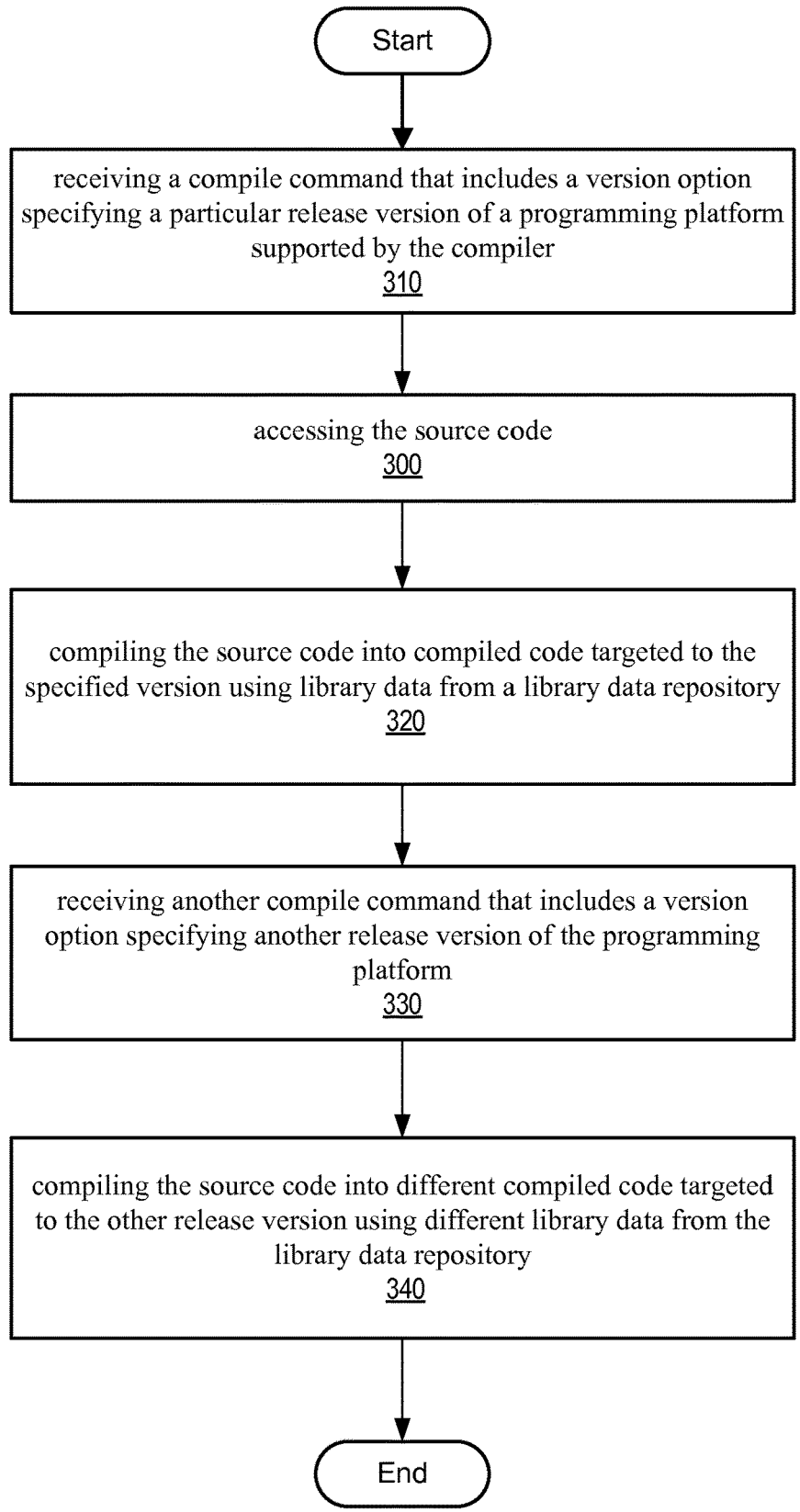
FIG. 3 is a flowchart illustrating one embodiment of a method cross-compiling for multiple versions of a programming platform, according to one embodiment.

Returning to FIG. 2, after accessing the relevant library data for the target release version, a multi-version compiler may compile the source code into compiled code targeted to the particular version using the particular library data and according to a particular version of a programming platform supported by the compiler, as shown in block 240. Thus, the compiled code may be configured to execute according to the target release version. Additionally, the compiler may be configured to output the compiled code as in block 250. For instance, in one embodiment, multi-version compiler 100 may be configured to generate one or more class files. In other embodiments, multi-version compiler 100 may be configured to output compiled code in various formats, such as by generating class files, object files, library files, etc., By utilizing a single command option, such as a "—platform" or a "—release" option, a developer may more easily (e.g., than when using traditional methods) cross compile the same source for multiple, different versions of a programming platform, according to some embodiments. FIG. 3 is a flowchart illustrating one embodiment of a method cross-compiling for multiple versions, according to one embodiment. As illustrated in block 300, a multi-version compiler may receive source code to be compiled and may also receive a compile command that includes a version option specifying a particular version, as in block 310. As described above, multi-version compiler 100 may receive source code 150 as well as compile command 160 that includes version option 165, according to some embodiments.

The compiler may then compile the source code into compiled code targeted to the particular version using library data from a library data repository, as shown in block 320. For instance, in one embodiment, multi-version compiler 100 may, in response to receiving compile command 160 with version option 165, may compile source code 150 using library data 140A from library data repository 130. Multi-version compiler 100 may access library data 140A from a particular location in library data repository 130 based, at least in part, on the value of version option 165.

Subsequently, the compiler may receive another compile command that includes a version option specifying a different version, as illustrated in block 330. In response, the compiler may compile the same source code into different compiled code targeted to the different version using different library data from the library data repository, as illustrated in block 340. For instance, multi-version compiler 100 may receive another compile command 160 that includes another version option 165 that specifies the different version. In response, multi-version compiler 100 may access library data 140B from library data repository 130 for use when compiling the source code.

In one example embodiment, a javac compiler may receive a compile command that includes a version option specifying version 6 of the JRE and in response may compile the source code into class files targeting version 6 of the JRE using library data corresponding to version 6 of the JRE. Subsequently the javac compiler may receive another compile command that includes another version option specifying version 7 of the JRE and in response may compile the source code into class files targeting version 7 of the JRE using library data corresponding to version 7 of the JRE.

Thus, a developer may utilize the same compile option with different values (e.g., such as a "—platform" or a "—release" option in some embodiments) to cross compile the same source code targeting different versions without having to obtain, provide and/or separately specifying multiple compile options, according to some embodiments.

Figure 4:
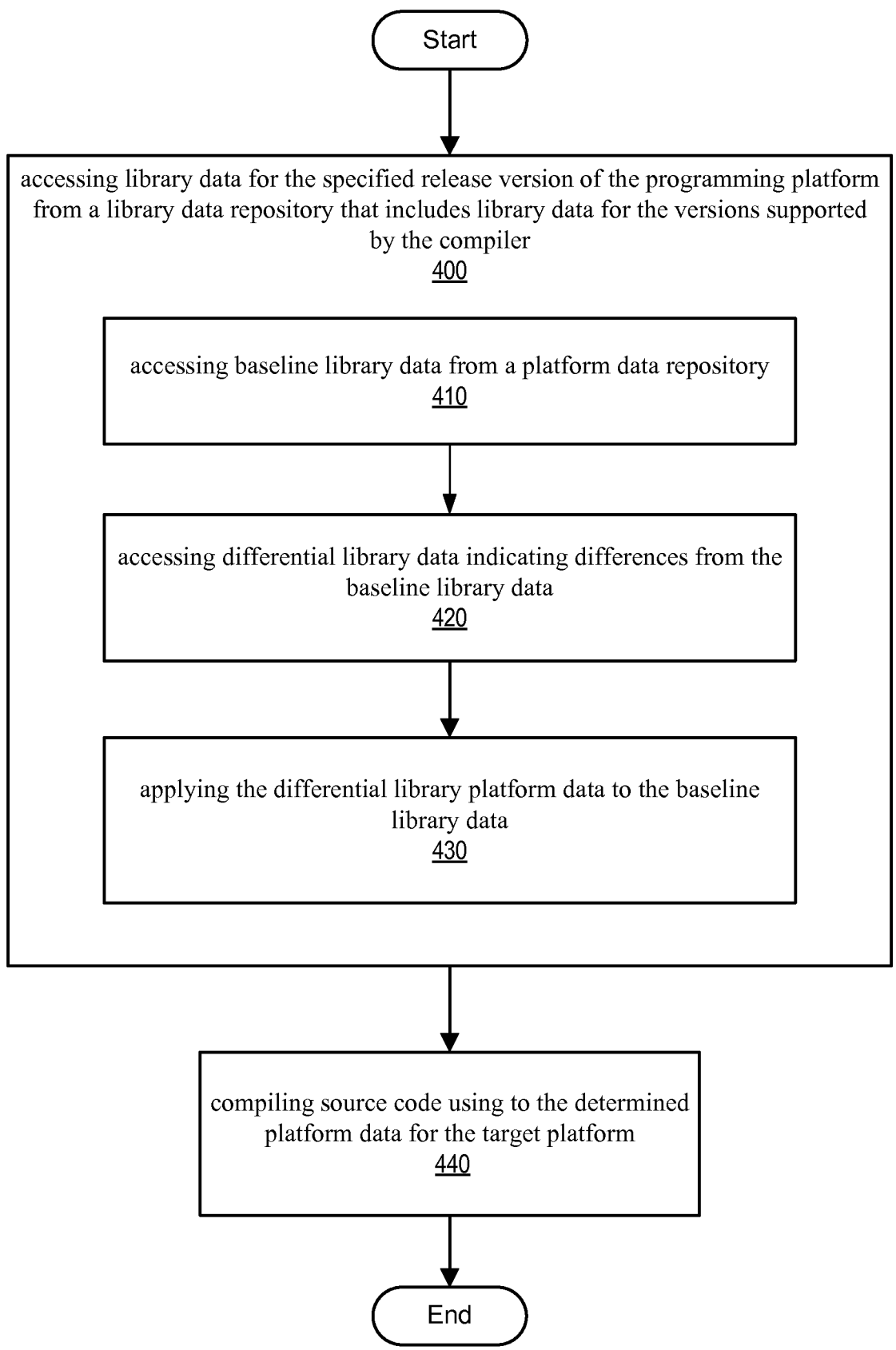
FIG. 4 is a flowchart illustrating one embodiment of a method for determining library data for a particular version of a programming platform using baseline and differential library data, as described herein.

FIG. 4 is a flowchart illustrating one embodiment of a method for accessing library data for a target release version, as described herein. A multi-version compiler may be configured to access library data for the target release version from a library data repository that includes library data for multiple versions of a programming platform supported by the compiler, as in block 400. In some embodiments, the library data in the library data repository may be formatted as a baseline set of library data and various sets of differential library data for individual versions supported by the compiler.

As shown in block 410, a multi-version compiler may access baseline library data from a library data repository and may also access differential library data representing differences from the baseline library data, as shown in block 420. For example, in one embodiment, the baseline library data may correspond to an initial (e.g., earliest or earliest supported) version of the programming platform while the differential library data may include information indicating one or more differences between that initial version and a later version of the programming platform.

In some embodiments, the baseline library data may correspond to a version of the programming platform that is subsequent to (i.e., later than) the target release version. Furthermore, in some embodiments, the baseline library data correspond to a version of the programming platform that is earlier than some (e.g., one or more) and later than others (e.g., one or more) of the other versions for which differential information may be accessed.

In other embodiments, however, the baseline set of library data may not correspond to any particular version (or family, edition, release, update, etc.) of the programming platform at all, but may simply be (or may represent) a baseline set the library data to which differential library data is applied to determine (or generate) complete library data for the various versions supported by the compiler.

As shown in block 430, the multi-version compiler may determine library data for the target version based, at least in part, on applying the differential library data to the baseline library data. Thus, the differential library data may be used to determine the library data for the target release version, according to some embodiments. For example, if a new method (or type, interface, class, API, etc.) were added to the target release version that was not part of the baseline version (in an embodiment in which the baseline library data corresponds to a version of the programming platform), information regarding the added method may be included as part of the differential library data for the target release version. Similarly, if a method (or type, interface, class, API, etc.) that was part of the baseline version was removed from the target release version, the differential library data may include information indicating that the method is not part of the target release version even if it was part of the baseline version. Additionally, if a method (or type, interface, class, API, etc.) was changed in the target release version as compared to the same method (or type, interface, class, API, etc.) in the baseline version, information indicating the differences between the version of the method (or type, interface, class, API, etc.) in the target release version compared to the version in the baseline version.

Thus, the multi-version compiler may determine library data for the target release version by applying the differential library data to the baseline library data, according to some embodiments. In one embodiment, the multi-version compiler may be configured to build a complete set of library data by modifying a copy of the baseline library data according to the differential library data. In another embodiment however, the multi-version compiler may be configured to utilize both the baseline library data and the differential library data as needed when compiling the source code without building a complete set of library data for the target release version, as will be explained in more detail below regarding FIG. 5.

As shown in block 440, the multi-version compiler may compile the source code using the determined library data for the target release version, according to some embodiments.

Figure 5:
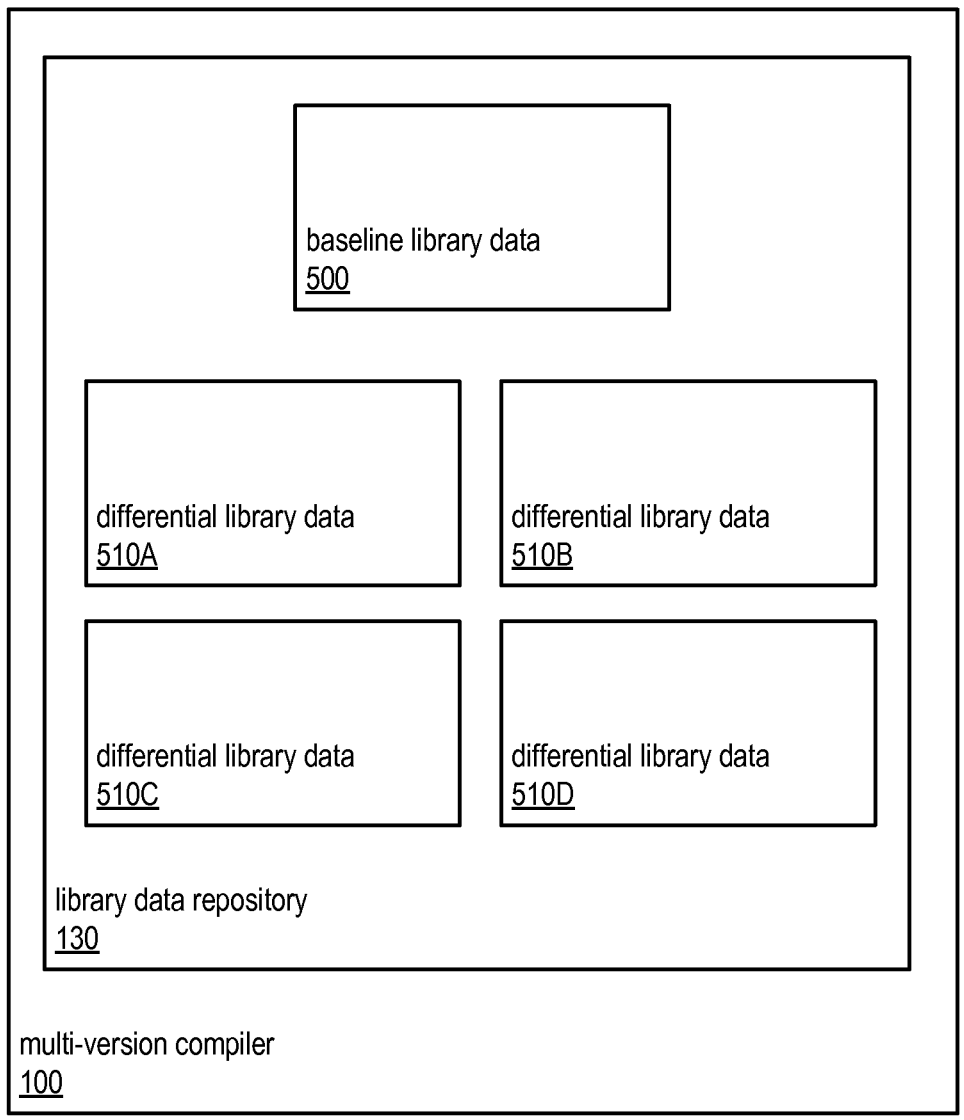
FIG. 5 is a logical block diagram illustrating a library data repository including both baseline and differential library data, according to one embodiment.

FIG. 5 is a logical block diagram illustrating a repository of library data including baseline library data and differential library data, according to one embodiment. For example, multi-version compiler 100 may include, or may be configured to access, library data repository 130 that may include library data for various versions of a programming platform (e.g., various families, editions, versions, editions, updates, or releases, etc. of one or more programming platforms) supported by the compiler. As noted above, library data may include information, such as information regarding the types, APIs, interfaces, etc., used when compiling for particular versions and the library data repository may include library data for various versions supported by the compiler.

Thus, library data repository 130 may include baseline library data 500 as well as one or more sets of differential library data, such as differential library data 510A, 510B, 510C, and 510D, according to one example embodiment. For instance, baseline library data 500 may be, include, or represent, a complete set of library data for a baseline version (family, edition, release, update, etc.) of the programming platform while differential library data 510A-D may be, include or represent, information indicating differences between the baseline version and a different version (or family, edition, release, update, etc.) of the programming platform.

In other embodiments, rather than representing library data for particular baseline version, baseline library data 500 may represent a baseline set of library data from which complete library data for the supported versions may be determined, such as by applying differential library data 510A, 510B, 510C and/or 510D to baseline library data 500.

Baseline library data 500 may, in one embodiment, represent information regarding a particular version while differential library data 510A-D may represent information for multiple other versions. For instance, in one embodiment, baseline library data 500 may represent library data for the earliest (or the earliest supported) version while differential library data 510A-D may represent differences between the baseline library data and various other versions. In other embodiments, however, baseline library data 500 may represent library data for a version that is earlier than some, while later than other, target release versions (represented by differential library data 510A-D).

In yet other embodiments, baseline library data 500 may not represent complete library data for any particular version, but instead may represent a set of baseline data from which complete library data for the various versions supported by the compiler may be determined or generated, such as applying differential library data 510A to baseline library data 500.

In some embodiments, rather than directly indicating differences from baseline library data 500, one or more of differential library data 510A-D may indicate difference from another set of differential library data. For instance, in one embodiment, differential library data 510A may include information indicating one or more differences from baseline library data 500 while differential library data 510B may include information indicating one or more differences from differential library data 510A. Additionally, differential library data 510C may include information indicating one or more differences from differential library data 510B, according to one example embodiment. Thus, in some embodiments, multi-version compiler 100 may have to access baseline library data 500 as well as multiple sets of differential library data in order to determine library data for a particular target release version.

In some embodiments, the baseline library data as well as each set of differential library data may all be stored in a single file, but in other embodiments, the library data may be split into multiple, smaller, files (such as to avoid having a single, large, file in a repository). In general, library data, such as baseline library data 500 and differential library data 510A-D may be stored in virtually any suitable manner and according to virtually any suitable data format.

As noted above, in some embodiment, library data repository 130, as well as baseline library data 500 and differential library data 510A-D may be local to multi-version compiler 100. In other embodiments, however, library data repository 130, as well as baseline library data 500 and differential library data 510A-D may be remote from (e.g., stored separately or on a separate storage device) multi-version compiler 100. In yet other embodiments, library data repository 130 may be distributed with one or more of sets of library data (e.g., baseline library data 500 and/or differential library data 510A-D) local to multi-version compiler 100, while other sets of library data (e.g., baseline library data 500 and/or differential library data 510A-D) remote from multi-version compiler 100.

Figure 6:
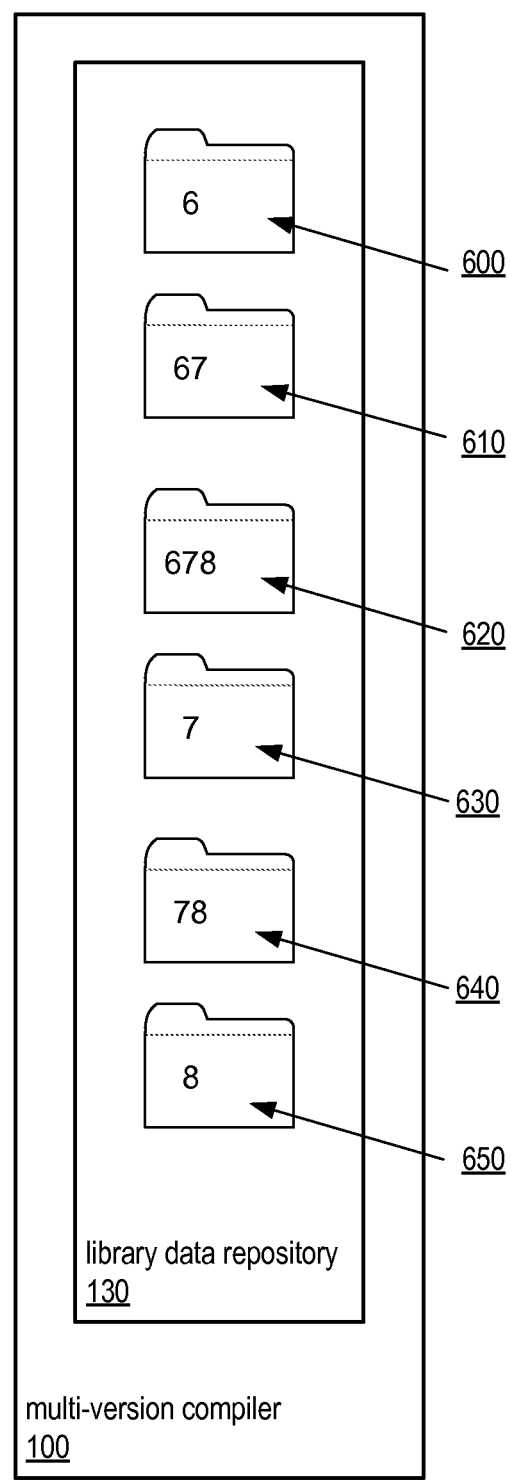
FIG. 6 is a logical block diagram illustrating a library data repository using a multi-version directory structure, according to one embodiment.

FIG. 6 is a logical block diagram illustrating a repository of library data using a multi-version directory structure, according to one embodiment. As described above, in some embodiments, library data for various target versions may be stored in a repository in any of various formats. FIG. 6 illustrates, according to one embodiment, library data stored using a directory structure. For example, library data repository 130 may include multiple files stored within various directories and each directory may include one or more files including library data for one or more versions. In some embodiments, the information included in any particular directory may represent library data for one or more versions. Additionally, the library data for any particular version may be spread across multiple directories. Additionally, the library data may be formatting in terms of baseline and differential data, as described above regarding FIG. 4 and FIG. 5, within a directory structure such as the one illustrated in FIG. 6. Thus, a multi-version compiler may access files from one or more of the directories in order to determine the library data for a particular target version.

For example, as illustrated in FIG. 6, library data repository 130 may include, in this example, six directories that collectively include library data for three different target versions of a programming platform (e.g., versions 6, 7, and 8 of an example programming platform), according to one embodiment. In some embodiments, the name of a directory may indicate for which versions that particular directory includes library data. For instance, directory 600 may be named (or may include as part of its name) "6" indicating that it includes library data for version 6 of the programming platform. Similarly, directory 610 may include "6" as part of its name indicating that it too includes library data for version 6 of the programming platform. Additionally, directory 620 may also include "6" as part of its name indicating that it also includes library data for version 6 of the programming platform.

Thus, in the example embodiment illustrated in FIG. 6, directories 600, 610 and 620 may each include (at least partial) library data for version 6 of the programming platform. A directory, such as directory 600, may only include library data for a particular version, such as for version 6 of the programming platform. Alternatively however, a directory, such as directory 610, may include library data that is common to more than one version, such as library data that is common to both version 6 and version 7. Thus, a directory may include library data for virtually any number of versions (families, editions, releases, updates, etc.) of a platform. For example, directory 620 may include library data that is common to versions 6, 7, and 8, according to the example embodiment illustrated in FIG. 6. Similarly, directory 630 may include library data for version 7, directory 640 may include library data common to versions 7 and 8, while directory 650 may include library data for version 8.

The exact nature and format of the library data that is stored in library data repository 130 may vary from embodiment to embodiment. For example, in one Java-based embodiment, the library data for the various target versions may be stored using one or more rt.jar files. In other embodiments, one or more ct.sym files may be used to store the library data. In one embodiment, a ct.sym file may be, or may include, stripped down versions (e.g., not include the bodies of methods, etc.) of classfiles corresponding to the classfile of the particular target release version. In yet other embodiments, a combination of different files may be used to store library data when using a directory structure, such as the one illustrated in FIG. 6.

Additionally, library data may be stored using a combination of techniques. For instance, in one embodiment, library data may be stored using a directory structure, such as that illustrated in FIG. 6, but also using a baseline and differential technique, such as that described above. For instance, directory 600 may include a baseline version of library data while directories, 610, 620, 630, 640 and 650 may include differential information (directory 610 may include differential information for library data that is common to both versions 6 and 7).

Additionally, in some embodiment, library data repository 130, as well as library data in directories 600, 610, 620, 630, 640 and 650, may be local to multi-version compiler 100. In other embodiments, however, library data repository 130, as well as library data in directories 600, 610, 620, 630, 640 and 650, may be remote from (e.g., stored separately or on a separate storage device) multi-version compiler 100. In yet other embodiments, library data repository 130 may be distributed with one or more sets of library data (e.g., library data in directories 600, 610, 620, 630, 640 and 650) local to multi-version compiler 100, while other sets of library data (e.g., library data in directories 600, 610, 620, 630, 640 and 650) remote from multi-version compiler 100.

Thus, an individual piece of library data, such as an individual type, that is only be present for a particular version of the programming platform may only be present within a single directory for that version of the programming platform. For example, a type that should only be present for version 6 of the JRE may only be included in the library data in directory 600 (e.g., the version "6" directory) without being included in the library data in directories 610 or 620, even though those directories may include other library data for version 6, according to one Java-based embodiment.

When utilizing library data stored using a directory structure, the directories may or may not be actual physical directories within a file system, according to various embodiments. For example, in some embodiments, the library data may be stored within a single, large, file while being structured according to various directories within the file. For instance, a ct.sym file may include various directories holding library data for target release versions, according to one Java-based embodiment.

Additionally, continuing with a Java-based example, the bootclasspath for a particular version N may then be composed of directories that include N (e.g., in the directory name). Each directory may include one or more classfiles representing (or defining) the library data for the various target versions. In some embodiments, the classfiles in the directories may represent ordinary classfiles that may be used in any manner that classfiles are otherwise used.

While described above using the directory names as indicators of the particular library data included in a particular directory, the manner in which a multi-version compiler may determine what library data is included in which directories may vary from embodiment to embodiment. For instance, in one embodiment, a separate file may map the contents of the directories, such that the multi-version compiler may utilize the map to determine which directories include the relevant library data for any particular target version. In general, any suitable method, technique or mechanism that allows a multi-version compiler to determine which directory (or directories) includes library data for a particular target version may be used when storing library data using a directory structure, as described herein.

Additionally, in some embodiments, multi-version compiler 100 and/or library data repository 130 may be configured to compile baseline and differential library data with a multi-version directory structure. For instance, in one embodiment, library data repository may include a set of baseline library data, such as in directory 600 for example, to which library data from other directories may be applied to determine library data for versions of the programming platform supported by a multi-version compiler 100.

Figure 7:
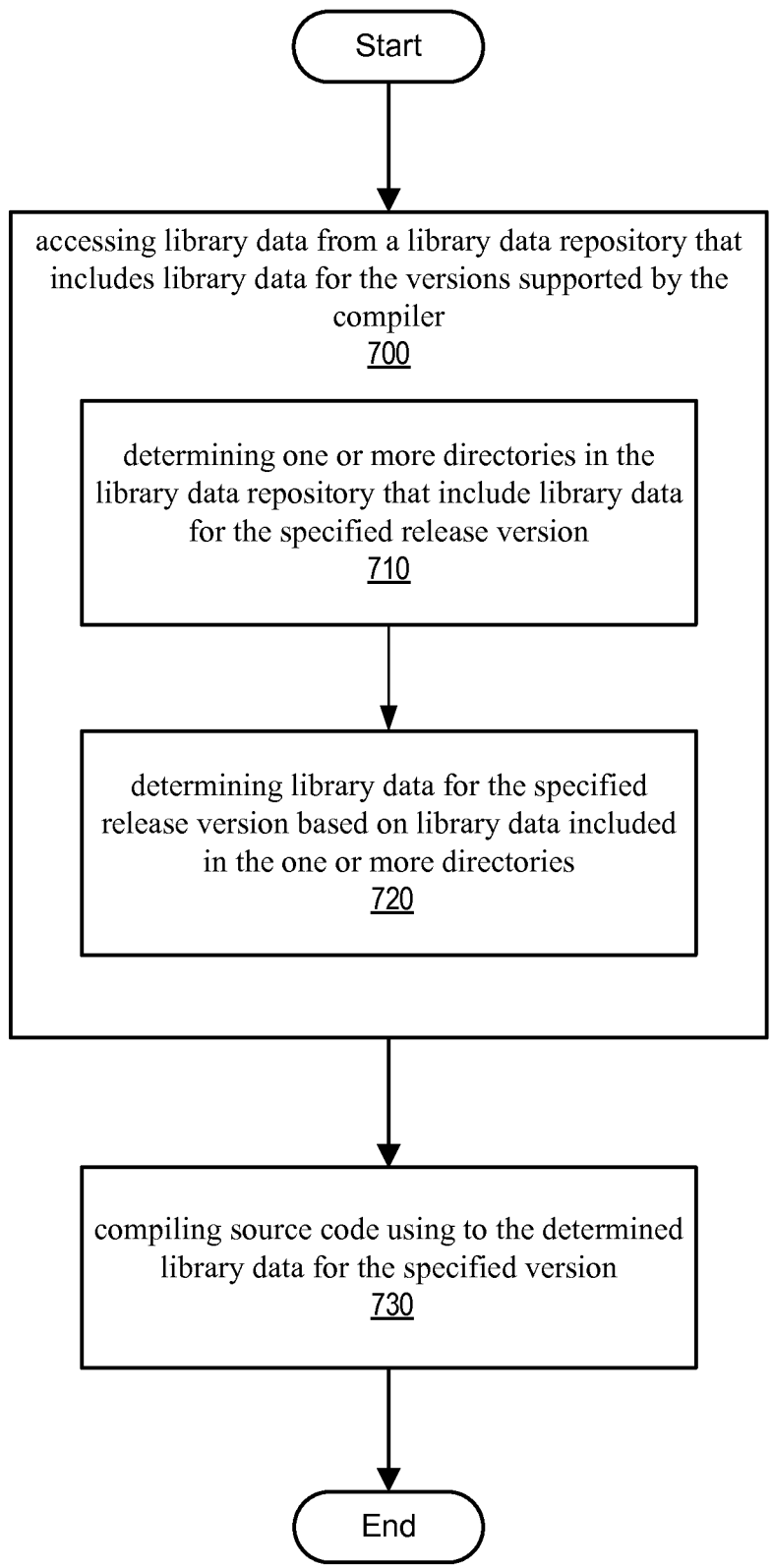
FIG. 7 is a flowchart illustrating one embodiment of method for accessing library data using a multi-version directory structure, as described herein.

When accessing library data for a target version using a directory structure, such as that illustrated above regarding FIG. 6, a multi-version compiler may be configured to access/read the library data for the target release version from one or more directories within the directory structure, according to various embodiments. FIG. 7 is a flowchart illustrating one embodiment of a method for accessing library data stored using a directory structure, as described herein. As shown in block 700, and described above, a compiler may be configured to access library data from a library data repository that includes library data for multiple release versions of a programming platform supported by a multi-version compiler, as described above regarding block 230 of FIG. 2 and block 400 of FIG. 4.

As shown in block 710, a multi-version compiler may be configured to determine one or more directories that include library data for the target release version. For example, multi-version compiler 100 may be configured to scan the directory structure to determine, such as by using the names of the individual directories, one or more of the directories that include library data for the target release version. Thus, according to one example embodiment, multi-version compiler 100 may determine that directories 600, 610 and 620 include information regarding version 6 of the programming platform. Similarly, if targeting version 7, multi-version compiler 100 may determine that directories 610, 620 and 630 include the appropriate library data.

Additionally, a multi-version compiler may be configured to determine library data for the target version based on the information included in the directories, as shown in block 720. For instance, after determining that directories 600, 610 and 620 include library data for version 6, a multi-version compiler may read that library data from those directories for use when cross-compiling.

In some embodiments, the multi-version compiler may combine the information from individual directories to build a complete set of library data for the target release version. For instance, using the example embodiment illustrated in FIG. 6 above, multi-version compiler 100 may combine the information from directory 600, directory 610 and directory 620 to build a complete set of library data for version 6. However, in other embodiments, multi-version compiler 100 may not combine the information from multiple directories and may instead utilize the library data individually as needed.

Additionally, the library data within the directory structure illustrated in FIG. 6 may also be formatted as baseline and differential data as described above regarding FIG. 4 and FIG. 5. Thus, multi-version compiler 100 may be configured to apply the library data from one or more of the directories to baseline library data when determining (or generating) library data for a particular target release version, according to some embodiments.

A multi-version compiler may then cross-compile a software module using (or according to) the determined library data, as shown in block 730. For example, multi-version compiler 100 may cross-compile a software module, targeting version 6 of the programming platform, according to the library data accessed from directories 600, 610 and 620. As noted above, when cross-compiling for a particular target release version according to library data for that particular version, a multi-version compiler may be configured to ensure that the software module, once compiled, may execute according to the types, methods, classes, APIs and/or interfaces for the target version as defined in the library data for the target version.

Figure 8:
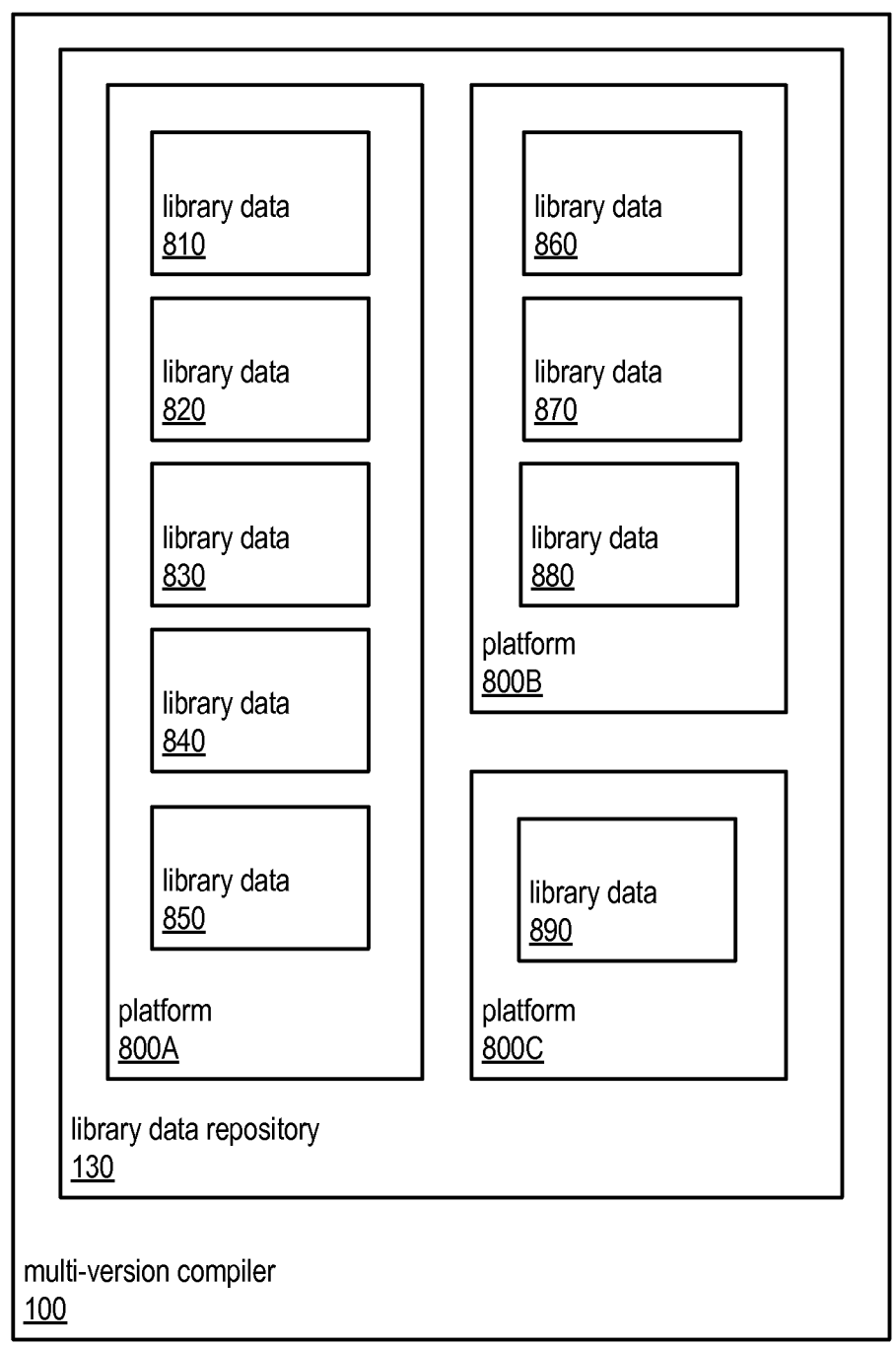
FIG. 8 is a logical block diagram illustrating a library data repository including multiple platforms with multiple versions, according to one embodiment.

FIG. 8 is a logical block diagram illustrating a library data repository including multiple platforms with multiple versions (families, editions, releases, updates, etc.), according to one embodiment. In some embodiments, multi-version compiler 100 may be configured to support multiple programming platforms as well as multiple versions (families, editions, releases, updates, etc.) of one or more programming platforms. For example, multi-version compiler 100 may support one or more versions of Java SE as well as one or more versions of Java ME, according to one embodiment. Additionally, library data repository 130 may also support (e.g., hold, maintain, store, etc.) library data for multiple platforms. Thus, library data repository 130 may include library for multiple platforms, such as platform 800A, platform 800B and platform 800C. As noted above, library data may include, but may not be limited to, information regarding the types, APIs, interfaces, etc., used when compiling source code for a version (family, edition, release, update, etc.) of programming platforms supported by multi-version compiler 100.

Each platform supported by multi-version compiler 100 may have one or more versions (families, editions, releases, updates, etc.) each with a corresponding version of library data needed by multi-version compiler 100 in order to target that particular version, according to various embodiments. For example, platform 800A may have five different (supported) versions and library data repository 130 may include library data for each one, such as library data 810, library data 820, library data 830, library data 840 an library data 850, illustrated in FIG. 8. Other platforms supported by multi-version compiler 100 may include different numbers of versions and library data repository may therefore include different numbers of versions for different supported platforms. For example, platform 800B may have three (supported) versions and therefore library data repository 130 may include three different sets of library data for platform 800B, such as library data 860, library data 870 and library 880. One or more supported platforms may only include one (supported) version and therefore library data repository 130 may only include one set of library data, such library data 890 of platform 800C.

FIG. 8 represents a logical arrangement of library data within library data repository 130 and does not necessarily represent an actual physical arrangement of library data. For instance, library data for different versions of a platform may not be stored together or contiguously within library data repository 130 and a library data repository 130 may not include any actual data structure corresponding to platforms 800A, 800B and/or 800C. Library data repository 130 may identify library data versions as belonging to different platforms in any of various manners, according to different embodiments. For example, in some embodiments, library data repository 130 may include information that maps a particular version (e.g., family, edition, release, update, etc.) of library data to a platform, either within the library data itself or separately. In other embodiments, library data repository 130 may group library data for different platforms into different groupings, such as in a hierarchy, according to the respective platforms to which the versions belong. In general, any suitable method or technique of identifying which library data correspond to different platforms may be utilized according to various embodiments.

Additionally, when multi-version compiler 100 supports multiple platforms (and/or multiple versions of multiple platforms), the library data for supported versions of those platforms may be stored within data repository 130 using any of various techniques described herein. For example, in one embodiment, the library data within library data repository 130 may be stored utilizing baseline and differential library data, as described above.

When using baseline and differential library data, library data repository 130 may include a baseline set of library data as well as differential library for each platform, according to one embodiment. In other words, library data 810 may represent baseline library data for platform 800A, while library data 860 may represent baseline library data for platform 800B, while library data 890 may represent a complete set of library data (since example platform 800C only includes one supported version) in one example embodiment.

In other embodiments, however, library data repository 130 may include a set of baseline library data (not illustrated in FIG. 8) to which other library data may be applied. For instance, library data 810, 820, 830, 840 and 850 may represent differential data that may be applied to the baseline library data to determine library data for the various supported versions of platform 800A. Similarly, library data 860, 870 and 880 may represent differential data that may be applied to the baseline library data to determine library data for the various supported versions of platform 800B. Additionally, library data 890 may represent differential data that may be applied to the baseline library data to determine library data for the supported version of platform 800C.

Furthermore, in some embodiments, library data repository 130 may be configured to store library data using a multi-version directory structured, such as described above regarding FIG. 6 that include library data for multiple platforms. For example, library data 810, 820, 830, 840 and 850 may represent multiple directories, each storing library data for one or more supported versions of platform 800A and multi-version compiler 100 may be configured to access one or more of the directories to determine library data for a particular version of platform 800A.

In some embodiments, library data repository 130 may be configured to combine the use of a multi-version directory structure as well baseline and differential library data when supporting multiple platforms. For example, in one embodiment, library data 810 may represent baseline library data for platform 800A and library data 820, 830, 840 and 850 may represent differential library data stored using a multi-version directory. Thus, multi-version compiler 100 may be configured to access library 810 to obtain the baseline library data and to apply one or more of library data 820, 830 840 and/or 850 as differential library data to the baseline library data when determining library data for a specified version (e.g., family, edition, release, update, etc.) of platform 800A supported by multi-version compiler 100.

Figure 9:
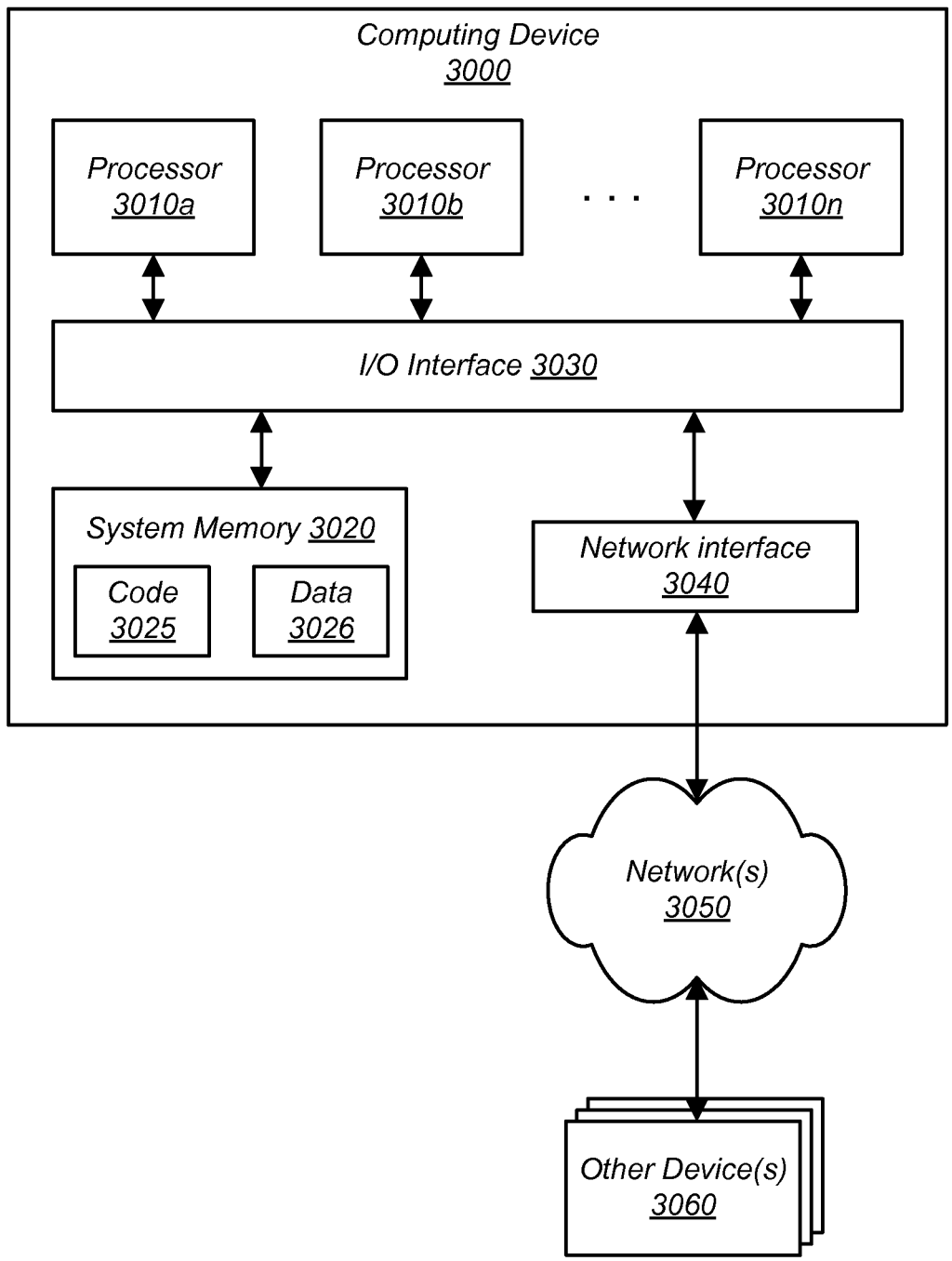
FIG. 9 illustrates an example computing device that may be used in some embodiments.

In at least some embodiments, a computer system that implements a portion or all of one or more of the technologies described herein may include a general-purpose computer system that includes or is configured to access one or more computer-readable media. FIG. 9 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing multi-version compiler 100, compile engine 110 and/or command interface 120, described above.

In various embodiments, multi-version compiler 100, compile engine 110 and/or command interface 120 (and/or any individual sub-modules thereof) may each be implemented in any of various programming languages or methods. For example, in one embodiment, multi-version compiler 100, compile engine 110 and/or command interface 120 may be written in any of the Java, C, C++, assembly, or other general purpose programming languages, while in another embodiment, one or more of them may be written using a different, more specialized, programming language. Moreover, in some embodiments, multi-version compiler 100, compile engine 110 and/or command interface 120 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-8 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium or upon a computer-readable storage medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by multi-version compiler 100 may, in some embodiments, be performed by compile engine 110 and/or command interface 120 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

The various methods as illustrated in the figures and described herein represent example embodiments of methods. The methods may be implemented in software, hardware, or a combination thereof. The order of method may be changed, and various elements may be added, reordered, combined, omitted, modified, etc.

Although the embodiments above have been described in detail, numerous variations and modifications will become apparent once the above disclosure is fully appreciated. Various modifications and changes may be made as would be obvious to a person skilled in the art having the benefit of this disclosure. It is intended that the invention embrace all such modifications and changes and, accordingly, the above description to be regarded in an illustrative rather than a restrictive sense. Furthermore, it is intended that the following claims be interpreted to embrace all such variations and modifications.

What is claimed is:

1. A system, comprising:
a processor; and
memory coupled to the processor, wherein in the memory comprises program instructions that when executed cause the processor to implement a compiler for a programming language, wherein the compiler comprises a library data repository including library data for each of a plurality of versions of the programming language supported by the compiler, wherein the library data comprises application programming interface (API) information for each of respective ones of the plurality of versions of the programming language, and wherein the compiler is configured to:
receive a compile command to compile source code, wherein the compile command comprises a version option specifying a single release version of the programming language for compiling the source code to produce compiled code targeted to the specified release version, wherein the specified release version is one of the plurality of versions of the programming language supported by the compiler, and wherein a location within the library data repository for particular library data for the specified release version is specified by the same version option and not in the compile command separate from the version option;
in response to receiving the compile command, the compiler is further configured to:
access the source code;
identify the location within the library data repository of the compiler according to the received version option to access the particular library data for the specified release version;
compile the source code, according to the received version option, into compiled code targeted to the specified release version, the compiled code comprising one or more accesses to interfaces of the specified release version generated according to the API information of the accessed particular library data from the location within the library data repository identified according to the received version option; and
output the compiled code targeted to the specified single release version of the programming language.

2. The system of claim 1, wherein the programming language is the Java Programming Language.

3. The system of claim 1, wherein the program instructions further cause the processor to:
install the compiler and the library data for the plurality of versions in the library data repository; and
wherein the compiler and the library data for the plurality of versions are installed as part of a single installation.

4. The system of claim 1,
wherein the library data repository comprises baseline library data and differential library data indicating one or more differences as compared to the baseline library data; and wherein to access the particular library data, the compiler is further configured to apply differential library data for the specified release version of the programming language to the baseline library data.

5. The system of claim 4, wherein the baseline library data corresponds to an earlier version of the programming language as compared to a version of the programming language to which the particular library data corresponds.

6. The system of claim 4, wherein the baseline library data corresponds to a later version of the programming language as compared to a version of the programming language to which the particular library data corresponds.

7. The system of claim 1, wherein the library data repository comprises a plurality of directories, each comprising library data for one or more of the plurality of versions supported by the compiler; and wherein library data for at least one of the plurality of versions is split among a plurality of the directories.

8. The system of claim 1, wherein the compiler is further configured to:
receive another compiler command to compile the source code, wherein the compile command comprises a version option specifying a different version of the programming language for compiling the source code;
compile the source code into different compiled code targeted to the different version using different library data from the library data repository; and
output the different compiled code.

9. A non-transitory, computer-readable storage medium storing program instructions that when executed on a computing device cause the computing device to perform:
receiving, by a compiler for a programming language, a compile command to compile source code, wherein the compile command comprises a version option specifying a single release version of the programming language for compiling the source code to produce compiled code targeted to the specified release version, wherein the specified release version is one of a plurality of versions of the programming language supported by the compiler, wherein the compiler comprises a library data repository including library data for each of a plurality of versions of the programming language supported by the compiler, wherein the library data comprises application programming interface (API) information for each of respective ones of the plurality of versions of the programming language, and wherein a location within the library data repository for particular library data for the specified release version is specified by the same version option and not in the compile command separate from the version option;
accessing, by the compiler, the source code;
identifying the location within the library data repository of the compiler according to the received version option to access the particular library data for the specified release version;
compiling, by the compiler, the source code, according to the received version option, into compiled code targeted to the specified release version, the compiled code comprising one or more accesses to interfaces of the specified release version generated according to the API information of the accessed particular library data from the location within the library data repository identified according to the received version option; and
outputting, by the compiler, the compiled code targeted to the specified single release version of the programming language.

10. The non-transitory, computer-readable storage medium of claim 9, wherein the program instructions further cause the computing device to perform:
installing the compiler and
the library data for the plurality of versions in the library data repository; and
wherein the compiler and the library data for the plurality of versions are installed as part of a single installation.

11. The non-transitory, computer-readable storage medium of claim 9,
wherein the library data repository comprises baseline library data and differential library data indicating one or more differences as compared to the baseline library data; and
wherein said accessing the particular library data comprises applying differential library data for the specified release version to the baseline library data.

12. The non-transitory, computer-readable storage medium of claim 11, wherein the baseline library data corresponds to an earlier version of the programming language as compared to a version of the programming language to which the particular library data corresponds.

13. The non-transitory, computer-readable storage medium of claim 11, wherein the baseline library data corresponds to a later version of the programming language as compared to a version of the programming language to which the particular library data corresponds.

14. The non-transitory, computer-readable storage medium of claim 9, wherein program instructions further cause the computing device to perform:
receiving another compile command to compile the source code, wherein the compile command comprises a version option specifying a different version of the programming language for compiling the source code;
compiling the source code into different compiled code targeted to the different version using different library data from the library data repository; and
outputting the different compiled code.

15. The non-transitory, computer-readable storage medium of claim 9, wherein the library data repository comprises a plurality of directories, each comprising library data for one or more of the plurality of versions supported by the compiler; and wherein library data for at least one of the plurality of versions is split among a plurality of the directories.

16. A method, comprising:
performing, by one or more processors:
receiving, by a compiler of a programing language, a compile command to compile source code, wherein the compile command comprises a version option specifying a single release version of the programming language for compiling the source code to produce compiled code targeted to the specified release version, wherein the specified release version is one of a plurality of versions of the programming language supported by the compiler, wherein the compiler comprises a library data repository including library data for each of a plurality of versions of the programming language supported by the compiler, wherein the library data comprises application programming interface (API) information for each of respective ones of the plurality of versions of the programming language, and wherein a location within the library data repository for particular library data for the specified release version is specified by the same version option and not in the compile command separate from the version option;

identifying the location within the library data repository of the compiler according to the received version option to access the particular library data for the specified release version;

compiling, by the compiler, the source code, according to the received version option, into compiled code targeted to the specified release version, the compiled code comprising one or more accesses to interfaces of the specified release version generated according to the API information of the accessed particular library data from the location within the library data repository identified according to the received version option; and outputting, by the compiler, the compiled code targeted to the specified single release version.

17. The method of claim 16, wherein the library data repository comprises baseline library data and differential library data, wherein the differential library data indicates one or more differences as compared to the baseline library data; and wherein said accessing the particular library data comprises applying differential library data for the specified release version to the baseline library data.

\* \* \* \* \*

UNITED STATES PATENT AND TRADEMARK OFFICE
CERTIFICATE OF CORRECTION

PATENT NO. : 11,640,284 B2
APPLICATION NO. : 14/957530
DATED : May 2, 2023
INVENTOR(S) : Darcy et al.

It is certified that error appears in the above-identified patent and that said Letters Patent is hereby corrected as shown below:

On the Title Page

Column 2, under Item (57) Abstract, Line 2, delete "complied" and insert -- compiled --, therefor.

In the Specification

In Column 4, Line 46, delete "with" and insert -- with) --, therefor.

In Column 11, Line 60, delete "may by" and insert -- may be --, therefor.

In Column 12, Line 53, delete ""—target'" and insert -- "—target" --, therefor.

In Column 13, Line 25, delete "etc.," and insert -- etc. --, therefor.

Signed and Sealed this
Twentieth Day of February, 2024

Katherine Kelly Vidal
*Director of the United States Patent and Trademark Office*